United States Patent [19]

Noda

[11] Patent Number: 4,572,455
[45] Date of Patent: Feb. 25, 1986

[54] FISHING REEL WITH REVERSIBLE CRANK

[75] Inventor: Hideo Noda, Sakai, Japan

[73] Assignee: Shimano Industrial Company Limited, Osaka, Japan

[21] Appl. No.: 626,977

[22] Filed: Jul. 2, 1984

[30] Foreign Application Priority Data

Jun. 30, 1983 [JP] Japan ............... 58-119880

[51] Int. Cl.[4] ............................................. A01K 89/02
[52] U.S. Cl. ................... 242/84.1 R; 242/217
[58] Field of Search .............. 242/84.1 R, 84.1 J, 242/84.2 R, 84.21 R, 211–221

[56] References Cited

U.S. PATENT DOCUMENTS

| 869,474 | 10/1907 | Atwood | 242/217 |
|---|---|---|---|
| 1,941,739 | 1/1934 | Crawford | 242/219 |
| 3,974,977 | 8/1976 | Kamikawa | 242/84.1 R |
| 4,368,856 | 1/1983 | Neufeld | 242/84.1 J |

Primary Examiner—Billy S. Taylor
Attorney, Agent, or Firm—Stevens, Davis, Miller & Mosher

[57] ABSTRACT

A fishing reel comprising a pair of side frames, a spool rotatably supported therebetween, and a drive mechanism having a handle and a drag mechanism. Rotary operating force of the handle can be transmitted to the spool through the drive mechanism. A tubular shaft which has an axis parallel to that of the spool supports a drag washer of the drag mechanism and a master gear of the drive mechanism. The tubular shaft is rotatably supported between the side frames. The handle shaft of the reel handle is selectively insertable into the tubular shaft at either end, so that the fishing reel having only one drive mechanism can be arranged in either left-handle type or right-handle type.

6 Claims, 7 Drawing Figures

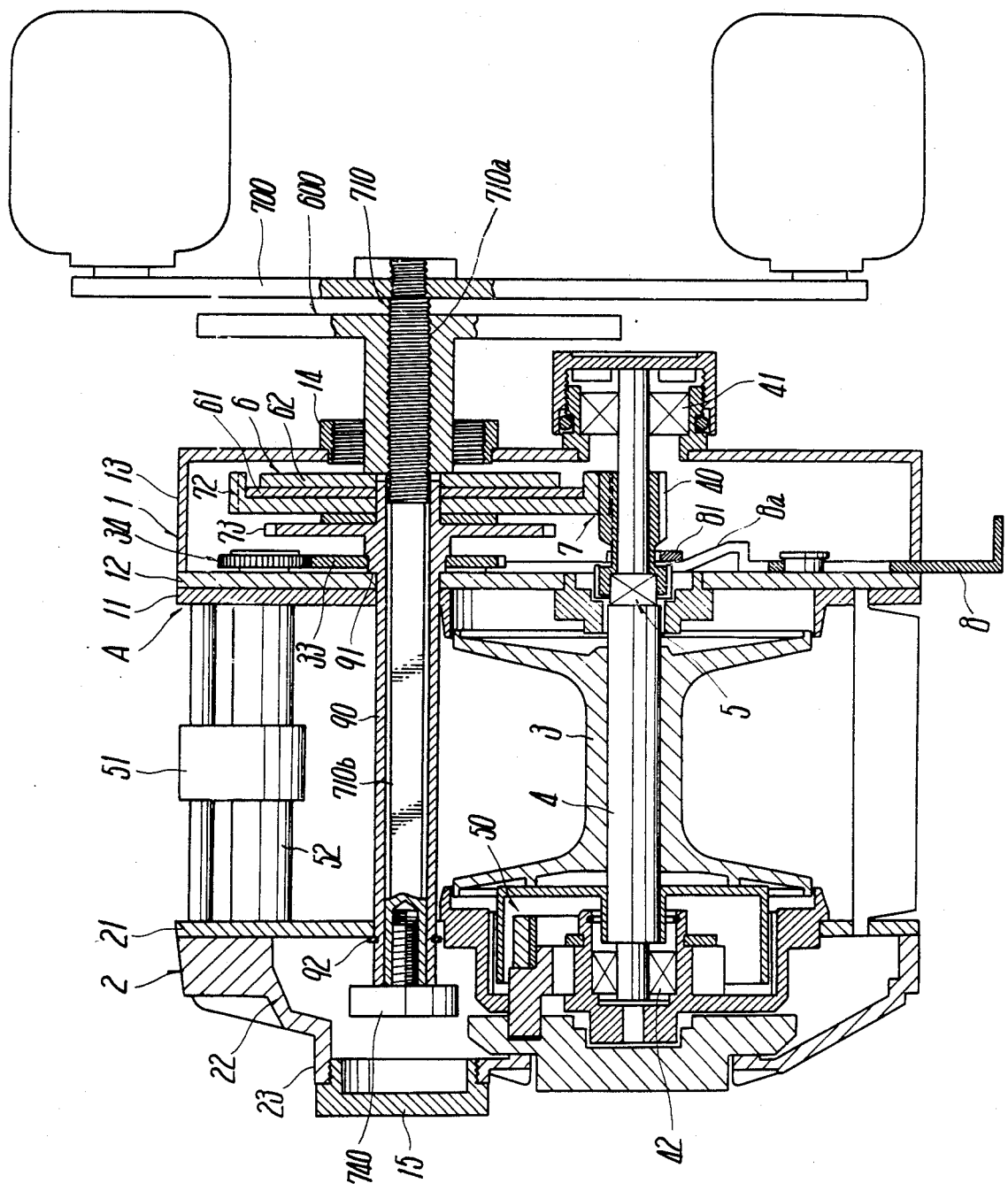

FISHING REEL WITH REVERSIBLE CRANK

FIELD OF THE INVENTION

The invention relates to a fishing reel, and more particularly to a fishing reel comprising a pair of side frames, spool and a spool shaft rotatably supported between the side frames, and a drive mechanism for driving the spool shaft, so that the spool is rotated to wind up a fishing line thereonto, or can be used otherwise cast to the wound line.

BACKGROUND OF THE INVENTION

Conventionally, a fishing reel, in which a spool is arranged between a pair of side frames and rotatably supported by a spool shaft, is basically so constructed that the spool is, as aforesaid, rotatably supported between a pair of side frames by a spool shaft, and within one of the side frames is housed a drive mechanism comprising a handle shaft and a drag mechanism supported peripherally thereof. A handle is mounted to the handle shaft, so that a rotary operation force of the handle is transmitted to the spool through the drag mechanism and the drive mechanism. The handle shaft of the conventional reel is arranged to be supported to a fixed shaft which is fixed to one of the side plates at the side frames and projects outwardly thereof, so that the handle is mounted to a single regular position at the reel body, i.e., one of the left-hand side and the right-hand side of the reel body. Thus, the setting position of the handle with respect to the reel body cannot be changed at the discretion of users.

Accordingly, the makers of fishing reels must provide separately both types of fishing reels for right-handle type and left-handle type, leading to a poor economy in production and storage of products, and larger manufacturing expenses. Such problems may be solved by that the handle can be changed in mounting position of the handle onto the reel in such manner that each side frame thereof is provided with respective drive mechanisms, and the handle and handle shaft are selectively mounted to one of the drive mechanisms. However, such feature is complex in construction, expensive to produce, and cause an increase in total weight of the device, so that the feature cannot basically solve the aforesaid problems.

SUMMARY OF THE INVENTION

The invention is designed to overcome the above-described problems. An object of the invention is to provide a fishing reel which employs merely one drive mechanism and allows the handle to be selectively mounted to the left-hand or right-hand side of the reel body, so that the fishing reel is adapted to serve as either a left-handle or a right-handle type.

The invention relates to an improvement of a fishing reel which basically comprises a pair of side frames having side plates opposite to each other at a regular interval, a spool shaft rotatably supported between the side frames and having a spool arranged between the side plates, and a drive mechanism for driving the spool shaft. The drive mechanism includes a handle shaft having a handle, a drag mechanism, and a master gear receiving a drive-force of the handle shaft through the drag mechanism and transmitting the drive-force to the spool shaft.

The invention includes a tubular shaft having an axis substantially parallel to an axis of the spool shaft. Respective axial ends of the tubular shaft are arranged to extend through the side plates of the side frames to be rotatably supported therebetween. The drag mechanism and master gear are supported to one axial end of the tubular shaft. Additionally, the tubular shaft is provided at the center with an inner cavity for receiving the handle shaft. The inner cavity is open outwardly of each side plate, so that the handle shaft can be selectively inserted into the tubular shaft at either axial end side thereof.

The handle shaft inserted in the tubular shaft can be fixed thereto by use of means for detachably fixing the handle shaft to the tubular shaft.

According to the invention which employs merely one drive mechanism, the fishing reel can be optionally changed to operate as a left-handle type or a right-handle type by a simple modification of the insertion direction of the handle shaft into the tubular shaft.

The invention merely requires a provision of a single drive mechanism at one of the pair of side frames, and the reel can be selectively changed to operate as a left-handle or right-handle type by means of the more simple construction of the present invention which provides for supporting the employed tubular shaft between the side frames, in comparison with the conventional reel, so that the invention can avoid an increase of expense and total weight of the device.

The invention is also characterized in that it can provide a fishing reel which is arranged to operate either in left-handle mode or in right-handle mode can use a single drag mechanism which is adjustable by use of a drag operating member. A first feature for adjustment of the drag mechanism is that a first and a second adjustment screwing member are screwed with the tubular shaft at its axial both ends. The drag operating member is supported to the handle shaft relatively rotatably therewith, and between the drag operating member and each adjustment screwing member is provided a transmission means for transmitting rotation of the drag operating member to each adjustment screwing member. A second feature for adjusting the drag mechanism is that the drag operating member is screwed with the handle shaft. According to these features, in either left-handle arrangement or right-handle arrangement, the drag operating member when operated to rotate can adjust the frictional engagement by which the drive force of the handle is transmitted to the master gear.

These and other objects of the invention will be made more apparent by the following explanation according to the attached drawings.

BRIEF DESCRIPTION OF THE DRAWINGS

FIGS. 6, 7 show a modified embodiment, FIG. 6 is a sectional plan view thereof and FIG. 7 is an explanatory view for an arrangement of a mounting position of the handle.

DETAILED DESCRIPTION OF THE INVENTION

Figure 1:
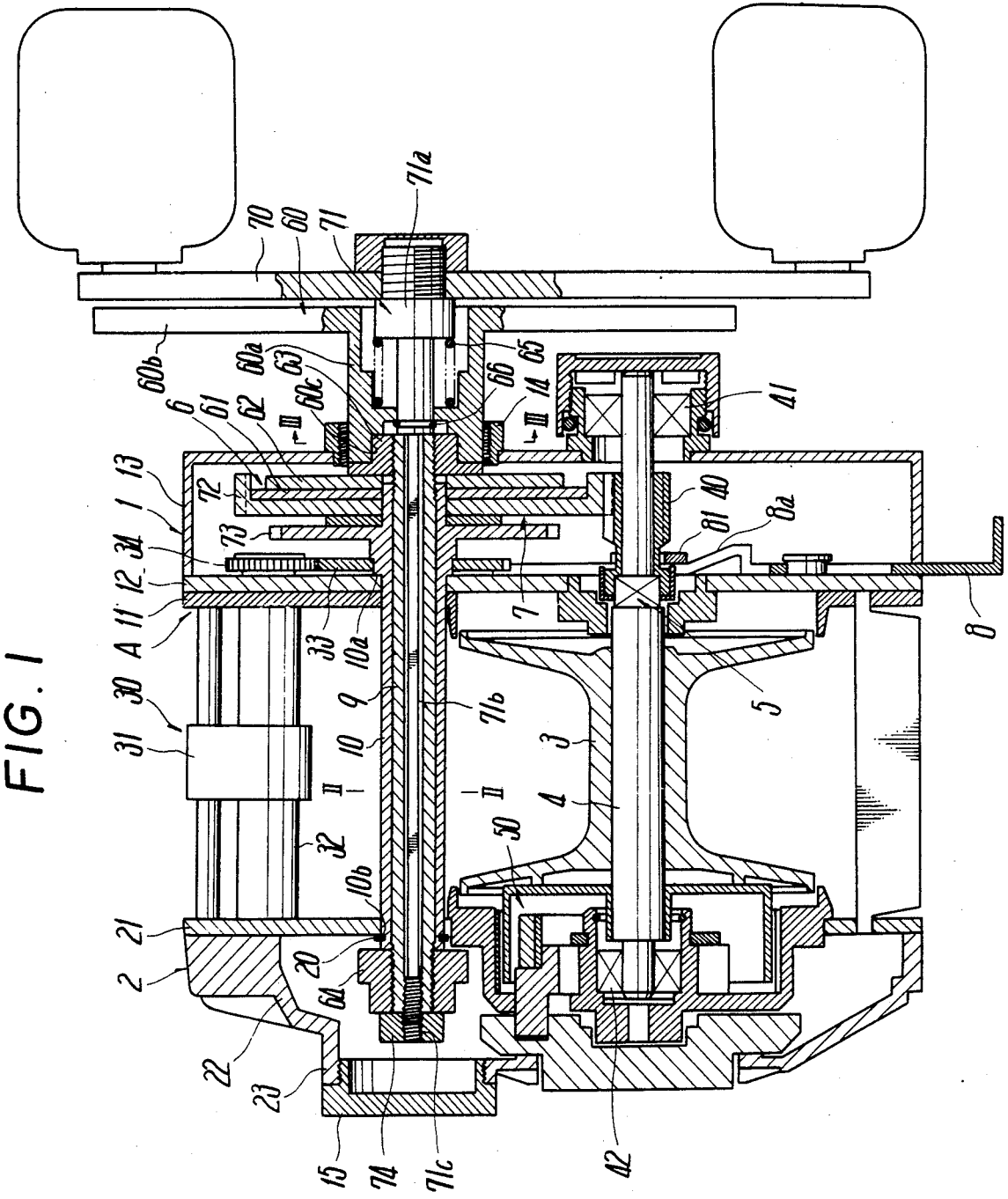
FIG. 1 is a cross-sectional plan view of an embodiment of a fishing reel of the invention.
Figure 4:
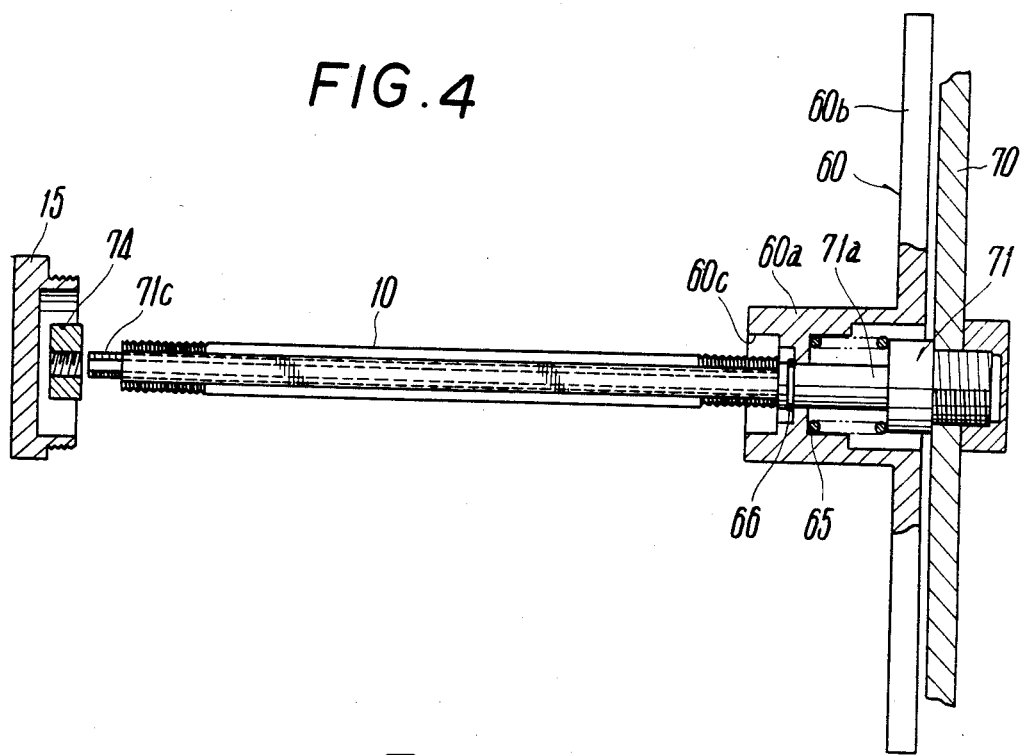
FIG. 4 is a sectional view of a principal part of the invention partially disassembled from the body.

The fishing reel shown in FIG. 1 is of a typical embodiment of the invention, and its basic construction includes a real body A which comprises a first side frame 1, a second side frame 2, and a plurality of connecting rods (not shown) for connecting the first and second side frames 1, 2. The first side frame 1 comprises a side plate 11 having at its center a through bore larger in diameter than the outer diameter of flanges of spool 3, a doubling plate 12 attached outside of the side plate 11, and a cup-shaped cover 13 attached outside of the doubling plate 12. The second side frame 2 comprises a side plate 21 having a bearing housing 23 at the center, and a cup-shaped cover 22 attached outside of the side plate 21. A spool shaft 4 having the spool 3 is freely rotatably supported between the first and second side frames 1, 2 by means of a pair of bearings 41, 42, so that a rotary operating force of a handle 70 is transmitted to the spool shaft 4 through a drive mechanism 7 having a drag mechanism 6 and a clutch 5 so as to rotate the spool 3. Additionally, a clutch lever 8 when operated to disconnect the clutch makes the spool 3 rotate freely.

The drive mechanism 7 comprises the handle 70, a handle shaft 71 (detailed later), the drag mechanism 6, and a master gear 72. One axial end of the spool shaft 4 is adapted to project into the first side frame 1, and a pinion gear 40 engageable with the master gear 72 is rotatably slidably supported at the projecting end of the spool shaft 4, so that a drive force can be transmitted to the spool shaft 4 through pinion gear 40 and the clutch 5 formed therebetween. In detail, a drive force from rotary operation of the handle 70 is transmitted to the master gear 72 through the handle shaft 71 and drag mechanism 6, and then is transmitted from the master gear 72 to the spool shaft 4 through the pinion gear 40 and the clutch 5 as aforesaid, thereby driving the spool 3.

The drag mechanism 6 shown in FIG. 1 comprises a drag washer 61, a contact plate 62 opposite thereto, and an adjustment screwing member (described later) pressing the contact plate 62. The contact plate 62 is supported axially movably but relatively not-rotatably with respect to a member which supports the contact plate 62, so that the adjustment screwing member can be operated to rotate and to cause the contact member 62 to move axially, thus pressing the drag washer 61 to allow the rotation force of the handle 70 to be transmitted to the master gear 72 through the contact plate 62 and drag washer 61.

When the adjustment screwing member is adjusted to press the drag washer 61 with less force, the master gear 72 can slidably rotate with respect to the handle 70.

The clutch 5 is so constructed that the spool shaft 4 is provided at its intermediate portion with a flat face, and the pinion gear 40 is provided with a tubular portion having a not-round inner face engageable with the flat face of the spool shaft. The tubular portion of pinion gear 40 is disengaged from the flat face portion of the spool shaft 4 by operation of the clutch lever 8 to make freely rotatable the spool shaft 4 and spool 3 fixed thereto.

The clutch lever 8 together with a clutch yoke 81 constitute a clutch operating mechanism, the with clutch yoke 81 holding the pinion gear 40 to always bias it in the direction for engagement of the clutch 5. The clutch lever 8 is formed in a fork-like shape and has a pushing portion 8a for pushing the clutch yoke 81. The clutch lever 8 is supported to the doubling plate 12 movably in reciprocation perpendicularly to the spool shaft 4, so that the clutch lever 8 when operated moves axially the clutch yoke 81 thanks to an operating force of the clutch lever 8 to thereby move the pinion gear 40 in the direction for disconnection of the clutch 5. Otherwise, the handle 70 is rotated to hit protuberances (not shown) (provided at an anti-reverse rotation gear 73) to the foremost end of the clutch lever 8 to thereby return the clutch lever 8. Thus the pinion gear 40 is moved by a pushing force of the clutch yoke 81 in the direction for engagement of the clutch 5.

The fishing reel shown in FIG. 1 is based on the above-described construction and includes such features that there is provided a tubular shaft 9 having an axis parallel to that of spool 3. The drag washer 61 and master gear 72 are mounted to the tubular shaft 9 which is rotatably supported between the side frames 1, 2. The handle shaft 71 and a drag operating member 60 can be selectively mounted to the tubular shaft 9 at either end side of the tubular shaft.

In more detail, the tubular shaft 9 is made longer than the interval between the side plates 11, 21, and both axial ends of tubular shaft 9 extend through the side plates 11, 21. The tubular shaft 9 has at its central portion a not-round inner cavity for receiving the handle shaft 71. The inner cavity is open outwardly of the side plates 11, 21, and the handle shaft 71 has a cross-section of not-round shape to be fittable into the inner cavity, so that the handle shaft 71 can be selectively inserted into the tubular shaft 9 at either axial end side of the tubular shaft.

In FIG. 1, there is provided a support shaft 10 shorter than the tubular shaft 9 which is rotatably supported between the side frames 1, 2 through the support shaft 10. The support shaft 10 is provided with the anti-reverse rotation gear 73 and has a support portion outward thereof, the with support portion supporting the master gear 72 and the drag washer 61 and contact plate 62 of the drag mechanism 6.

Figure 2:
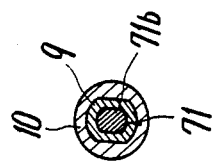
FIG. 2 is a sectional view taken on the line II—II in FIG. 1.

The support shaft 10 is formed to be round at the outer face as shown in FIG. 2, and is provided at the center with a not-round shaped inner cavity for receiving the tubular shaft 9. The outer face of the tubular shaft 9 is formed in a not-round shape to be fittable into the support shaft 10, so that the tubular shaft 9 can be inserted into the support shaft 10 axially movably but relatively not-rotatable with respect thereto.

The tubular shaft 9 is provided at the outer periphery of both its axial ends with a screw thread portion with which a first and second adjustment screwing member 63, 64, for adjusting the drag mechanism 6, are screwed.

The support shaft 10 is provided with a stepped portion 10a at one axial end side, and at its other axial end side with an engaging groove 10b into which a stopper ring 20 is fit, so that the stopper portion 10a is abutted to the doubling plate 12 of side frame 1 while the stopper ring 20 fit into the engaging froove 10b. This allows the support shaft 10 between the side plate 11, 21 to be axially not-movable but rotatable.

The handle shaft 71 comprises a base 71a supporting the handle 70, and a fitting shaft portion 71b onesidedly extending from the base 71a and fitted into the tubular shaft 9 axially movably but relatively not-rotatable with respect thereto. The handle 70 is supported to the base 71a by use of a screwing means in relation of being relatively not-rotatable with respect to the base 71a.

The fitting shaft portion 71b is made longer than the tubular shaft 9 and has a screw-thread portion 71c at the outer periphery of its foremost end. A screwing member 74 constituting a fixing means is screwed with the screw-thread 71c to fix the handle shaft 71 inserted into tubular shaft 9 thereto. Thus, when the handle 70 is rotated, its drive-force is transmitted from the handle shaft 71 and the tubular shaft 9 and support shaft 10 integrally rotatable with the handle shaft 71 to the master gear 72 through the drag mechanism 6.

When the screwing member 74 is detached, the handle shaft 71 can be removed from the tubular shaft 9, so that either a right-handle arrangement (FIG. 1) or a left-handle arrangement (FIG. 5) can be selected by arrangement of the insertion direction of the handle shaft 71 into the tubular shaft 9.

Figure 3:
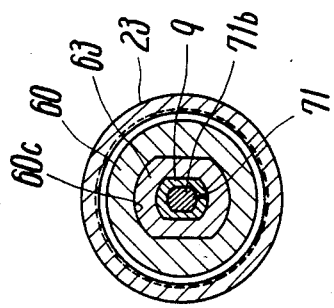
FIG. 3 is a sectional view taken on the line III—III in FIG. 1.

The drag operating member 60 for adjusting the drag mechanism 6 comprises a tubular portion 60a and an operating portion 60b extending radially outwardly at one lengthwise end of the tubular portion 60a. The tubular portion 60a is, as shown in FIG. 3, provided at an inner face of its foremost end portion with a not-round fitting portion 60c with which the first and second adjustment screwing members 63, 64 engage at their not-round outer faces so that the rotary operation of the drag operating member 60 can be transmitted to the screwing members 63, 64.

The drag operating member 60 is assembled with the handle shaft 70 to be rotatably supported thereto. A spring 65 is interposed between the drag operating member 60 and the base 71a at handle shaft 71, so that the drag operating member 60 can be held undetachably by the spring 65 and a stopper ring 66 retained to the handle shaft 71.

As shown in FIG. 1, when the handle shaft 71 is inserted into the tubular shaft 9 at its right side, the drag operating member 60 fits onto the first screwing member 63. In this instance when the drag operating member 60 is operated to rotate, it rotate the first screwing member 63 to axially screw the same forward or backward to thereby adjust the drag mechanism 6.

Figure 5:
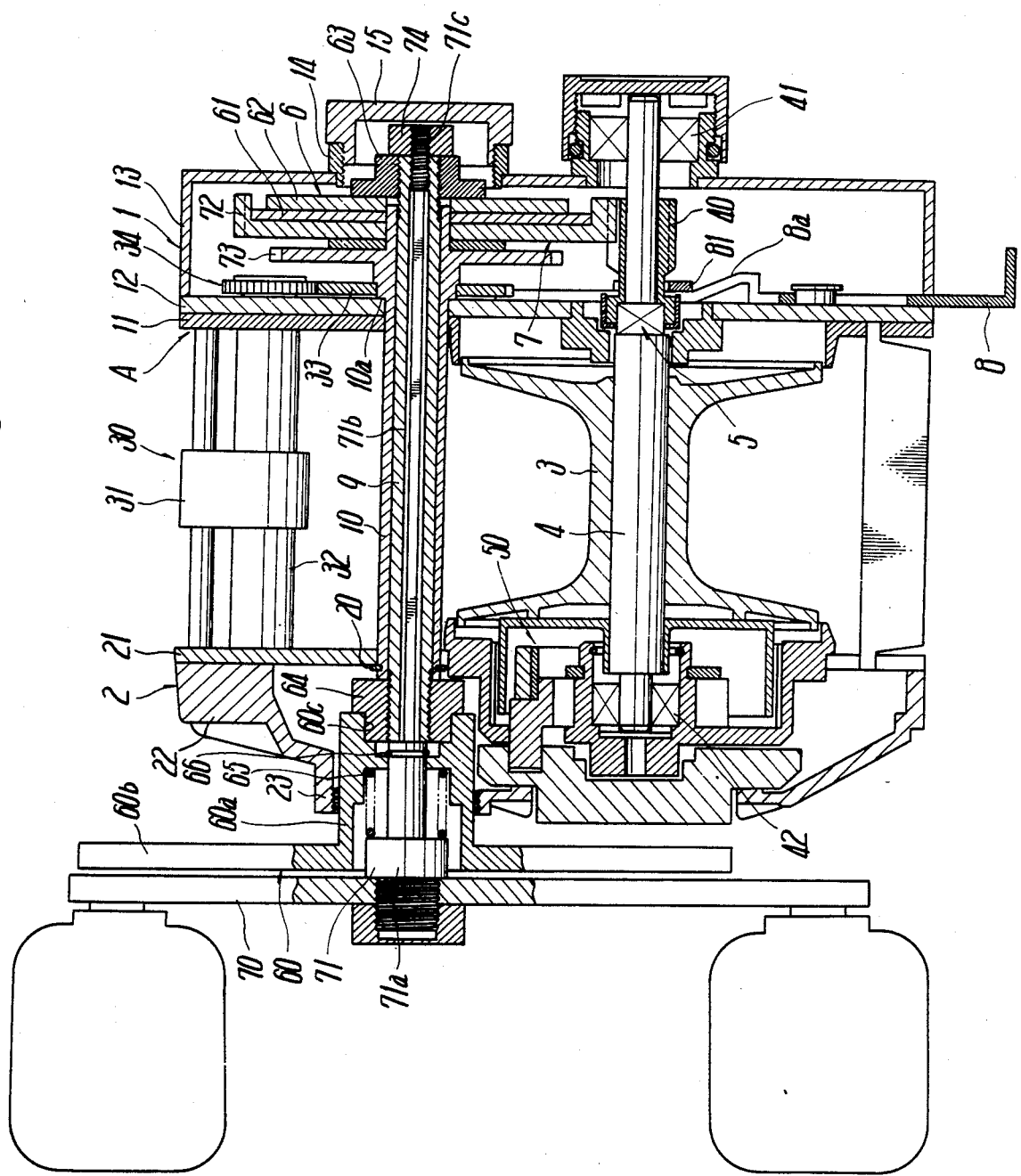
FIG. 5 is an explanatory view for an arrangement of a mounting position of the handle shaft.

In FIGS. 1 and 5, reference numeral 30 designates a traverse mechanism for guiding a fishing line when wound onto the spool 3. The traverse mechanism 30 comprises a line guide 31, a guide rod 32 supporting the line guide, and a traverse shaft (not shown) provided with the guide rod 32. The traverse shaft is provided at its one end with a guide gear 34 engageable with a sub-gear 33 which is supported onto the support shaft 10 relatively not-rotatably thereto.

Each cover 13, 22 at the side frames 1, 2 is provided with a through bore larger in diameter than the tubular portion 60a of drag operating member 60. At the through bore at the cover 13 is held a cap mounting cylinder 14 having an inner screw thread, and the cover 22 is integrally provided with a cap mounting cylinder 23 having an inner screw thread and defining the through bore. One cap 15 is selectively fit to either of mounting cylinder 14, 23 to close one of the through bores.

In FIGS. 1 and 5, reference numeral 50 designates a magnet brake for applying a resistance to free rotation of the spool 3.

For a right-handle arrangement of the fishing reel, the fitting shaft portion 71b of handle shaft 71 is inserted into the tubular shaft 9 at its opening end at the first side frame 1 side to allow the screw thread portion 71c to project outwardly of the tubular shaft 9 at its opening end at the second frame 2 side. Then, the fixing screwing member 74 is screwed with the screw thread portion 71c to fix the handle shaft 71 to the tubular shaft 9, while the fitting portion 60c of drag operating member 60 is fit to the first screwing member 63 at the end of tubular shaft 9. In this case, the rotary operating force of handle 70 is transmitted from the handle shaft 71, tubular shaft 9, support shaft 10, drag mechanism 6, and master gear 72 to the spool shaft 4 through the pinion gear 40 and clutch 5, to thereby rotate the spool 3.

When the drag operating member 60 is rotated, it allows the first screwing member 63 to screw forward or backward so as to adjust a pressing force of the drag mechanism.

For a left-handle arrangement of the fishing reel, the cap 15 and the fixing screwing member 74 are removed at and through the through bore. The handle shaft 71 is pulled out from the tubular shaft 9, and the drag operating member 60 from the first screwing member 63. The handle shaft 71 and drag operating member 60 are turned over as shown in FIG. 5, then, the fitting shaft portion 71b is, as shown in FIG. 5, inserted into the tubular shaft 9 at its opening at second side frame 2. The fixing screwing member 74 is screwed onto the foremost screw-thread 71c so as to set the handle shaft 71 to the tubular shaft 9, while the fitting portion 60c of drag operating member 60 is fit onto the second screwing member 64 screwed with the end of tubular shaft 9 at the second frame side. In this case, the rotary operating force of handle 70 is transmitted to the spool shaft 4 in the same manner and course as the right-handle arrangement. And, when the drag operating member 60 is rotated, it causes the second screwing member 64 to rotate to thereby axially move the tubular shaft 9 relatively with the second screwing member 64, so that a force of this movement is applied to the contact plate 62 and drag washer 61 through the fixing screwing member 74 and first screwing member 63, thereby adjusting the pressing force of the drag mechanism.

In the above-described embodiment, the tubular shaft 9 is rotatably supported between the side frames 1, 2 by use of the employed support shaft 10. Alternatively, the support shaft 10 may be eliminated, and the tubular shaft 9 may be supported between the side frames 1, 2 directly or by use of bearings. This feature is for example as shown in FIGS. 6, 7.

FIG. 6 shows a fishing reel arranged to operate as a right-handle type, and is so constructed that the tubular shaft 90 is only rotatably supported between the side frames 1, 2. The tubular shaft 90 directly supports at the outer periphery of its projecting portion within the first side frame 1 the drag washer 61, master gear 72, contact plate 62, anti-reverse rotation plate 73 and the sub-gear 33. A handle shaft 710 is provided at its base with a screw-thread portion 710a. A drag operating member 600 is provided with an operating portion 600b and a tubular portion 600a which is screwed with the screw-thread portion 710a. A fitting shaft portion 710b of the handle shaft 710 is inserted into the tubular shaft 90 axially movably but relatively not-rotatable with respect thereto, and a fixing screwing member 740 is screwed with an foremost end of the fitting shaft portion 710b, thereby supporting the handle shaft 710 to the tubular shaft 90. And, the tubular portion 600a of drag operating member 600 is adapted to directly contact at the edge face with the contact plate 62.

Figure 7:
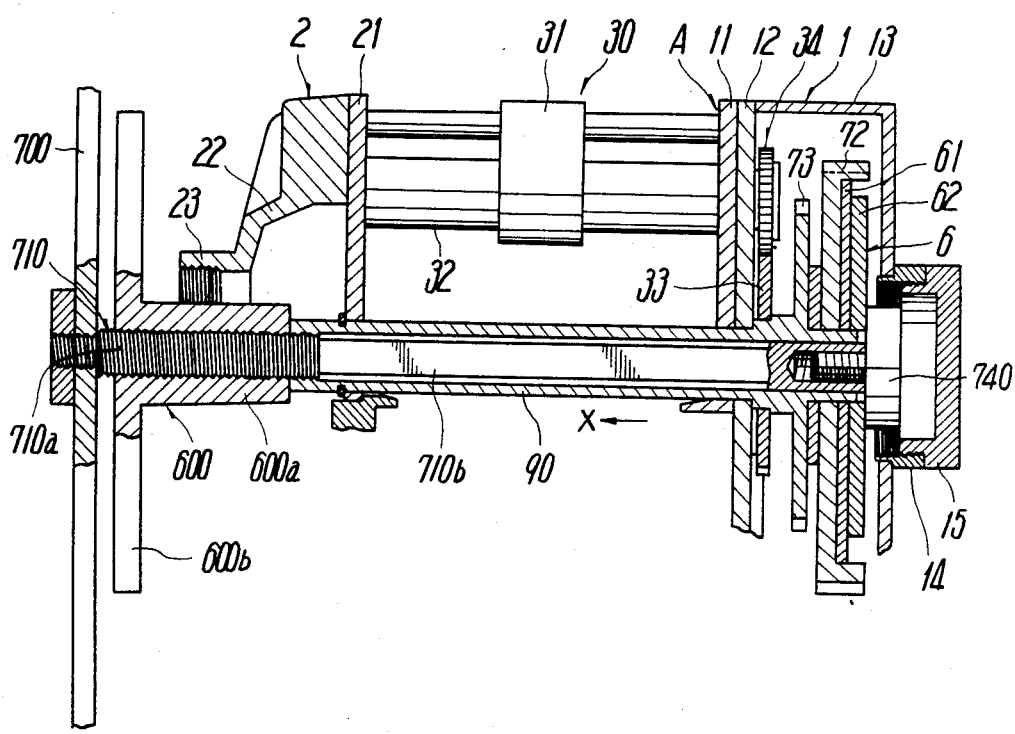

For a left-handle arrangement of the reel shown in FIG. 6, the fixing screwing member 740 is removed, and the handle shaft 710 is pulled out from the shaft 90, is then turned over to be inserted again-thereinto at the opening of tubular shaft 90 at the second side frame 2 as shown in FIG. 7. Then, the fixing screwing member 740 is screwed onto the foremost end of handle shaft 710. In this case, when the drag operating member 600 is rotated to screw forward the handle shaft 710 moves in the direction of arrow X shown in FIG. 7 with respect to drag operating member 600, so that a force of this movement is applied to the drag washer 61 and contact plate 62 through the fixing screwing member 740.

The same elements in FIGS. 1–5 and FIGS. 6, 7 are designated with the same reference numerals, and explanation thereof are not repeated for the latter embodiment. But, the handle having a different construction is designated by reference numeral 700, and the stepped portion and stopper ring for preventing an axial movement of tubular shaft 90 are designated by the respective reference numerals 91, 92.

As seen from the above, the invention provides that the employed tubular shaft 9, 90 is supported between the side frames 1, 2, so that the handle shaft 71, 710 can be selectively mounted to the tubular shaft 9, 90 at either axial end. Thus, while the reel of the present invention employs only one drive mechanism 7, it can be arranged to operate in either right-handle type or left handle type by a simple operation. Additionally, in either type of handle arrangement, the drag mechanism can be surely actuated and operated.

Furthermore, an employment of the drag operating member 60, 600 allows the drag mechanism to be adjustable to operate in either a right-handle arrangement or a left-handle arrangement of the reel.

While specific exemplary embodiments of the invention have been shown and described, the invention is not to be considered as limited thereto as numerous modifications can be made. Accordingly the invention is to be considered as limited solely by the following claims.

I claim:

1. A fishing reel comprising:
   a pair of side frames having side plates opposite to each other at a regular interval,
   a spool shaft rotatably supported between said side frames and having a spool arranged in said interval between said side plates,
   a drive mechanism for driving said spool shaft, said drive mechanism comprising a handle shaft having a handle, a drag mechanism for applying a rotational resistance against rotation of said spool, and a master gear for receiving a drive force of said handle shaft through said drive mechanism and transmitting the drive force to said spool shaft,
   said drive mechanism including a tubular shaft which has an axis substantially parallel to an axis of said spool shaft and extending through said side plates at said side frames to be rotatably supported between said side frames, said tubular shaft supporting at one axial end said drag mechanism and said master gear, said tubular shaft having a central portion with an inner cavity for receiving said handle shaft, said inner cavity opening outwardly of each of said side plates, said handle shaft being selectively insertable into either axial end of said tubular shaft, said driving mechanism further comprising fixing means for detachably fixing said handle shaft after said handle shaft has been inserted into said tubular shaft with respect to said tubular shaft, and
   a drag operating member rotatably supported on said handle shaft at a side thereof at which said handle is mounted, said drag operating member comprising means for adjusting said rotational resistance applied by said drag mechanism responsive to rotation of said drag operating member relative to said handle shaft.

2. A fishing reel according to claim 1, wherein said handle shaft is longer than said tubular shaft, said handle shaft when inserted into said tubular shaft including a projecting portion which projects at a longitudinal end from said tubular shaft, and said said fixing means including means for detachably fixing said handle shaft is located at said projecting portion of said handle shaft.

3. A fishing reel according to claim 2, wherein said drive mechanism further comprises means disposed between said handle shaft and said tubular shaft for causing said handle shaft when inserted into said tubular shaft to not rotate relative to said tubular shaft, and stopper means disposed at said projecting portion of said handle shaft for stopping axial movement of said handle shaft when inserted into said tubular shaft with respect to said tubular shaft.

4. A fishing reel according to claim 1, wherein said tubular shaft includes a support shaft for supporting said tubular shaft between said side frames, said support shaft having a support portion for supporting said drag mechanism and said master gear, and said tubular shaft having at respective axial ends a first and a second adjustment screwing member for adjusting said drag mechanism.

5. A fishing reel according to claim 4, wherein includes between said drag operating member and said first and second adjustment screwing members is provided a transmission means for transmitting rotary operation of said drag operating member to said adjustment screwing members.

6. A fishing reel according to claim 1, wherein said handle shaft comprises a base for mounting said handle and a fitting portion extending from said base and fitted into said tubular shaft, said base includes at its outer periphery a screw thread, said drag operating member for adjusting said drag mechanism is connected with said base of said handle shaft, and said fixing means includes a detachable stopper means disposed at a foremost end of said fitting portion of said handle shaft for stopping axial movement of said handle shaft with respect to said tubular shaft.

* * * * *